(12) United States Patent
Katoh et al.

(10) Patent No.: US 9,802,513 B2
(45) Date of Patent: Oct. 31, 2017

(54) SEAT

(71) Applicant: TOYOTA JIDOSHA KABUSHIKI KAISHA, Toyota-shi, Aichi (JP)

(72) Inventors: Kohshi Katoh, Hadano (JP); Eishi Takeuchi, Nagoya (JP); Yasuhiro Suwa, Susono (JP); Yasuhiro Inuzuka, Toyota (JP)

(73) Assignee: TOYOTA JIDOSHIA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/906,653

(22) PCT Filed: Jul. 24, 2013

(86) PCT No.: PCT/JP2013/070080
§ 371 (c)(1),
(2) Date: Jan. 21, 2016

(87) PCT Pub. No.: WO2015/011803
PCT Pub. Date: Jan. 29, 2015

(65) Prior Publication Data
US 2016/0159254 A1 Jun. 9, 2016

(51) Int. Cl.
*B60N 2/22* (2006.01)
*A47C 1/024* (2006.01)
(Continued)

(52) U.S. Cl.
CPC .............. *B60N 2/22* (2013.01); *A47C 1/024* (2013.01); *A47C 7/405* (2013.01); *A47C 7/48* (2013.01);
(Continued)

(58) Field of Classification Search
CPC ... B60N 2/22; B60N 2/02; B60N 2/10; B60N 2/18; B60N 2/1839; B60N 2/2222;
(Continued)

(56) References Cited

U.S. PATENT DOCUMENTS 5,588,704 A * 12/1996 Harza ................. A47C 3/0255
297/314
5,769,492 A * 6/1998 Jensen .................. A47C 9/002
297/188.09

(Continued)

FOREIGN PATENT DOCUMENTS

| CN | 100353889 C | 12/2007 |
|---|---|---|
| JP | S6340237 U | 3/1988 |
| JP | H639565 U | 5/1994 |
| JP | 2006199118 A | 1/2005 |
| JP | 2012166772 A | 9/2012 |
| WO | 2013021497 A1 | 2/2013 |

*Primary Examiner* — Philip Gabler
(74) *Attorney, Agent, or Firm* — Andrews Kurth Kenyon LLP

(57) ABSTRACT

A seat includes a pivotally movable bottom, a pivotally movable backrest independent from the bottom, a first supporter suspending and supporting a front side of the bottom, and a second supporter suspending a rear side of the bottom from a side behind the backrest section, and pivotally movably supporting the bottom together with the first supporter. According to the seat, the front side and the rear side of the bottom are suspended and supported. Thus, compared to a seat in which a front side of a bottom is supported in a cantilever manner, the seat is capable of ensuring bearing capacity for a seating load. The rear side of the bottom is suspended and supported from a side behind the backrest section. Accordingly, a support structure around the bottom including the front side of the bottom can be downsized.

11 Claims, 17 Drawing Sheets

(51) Int. Cl.
*A47C 7/40* (2006.01)
*A47C 7/48* (2006.01)
*B60N 2/18* (2006.01)
*B60N 2/10* (2006.01)
*B60N 2/66* (2006.01)
*B60N 2/02* (2006.01)

(52) U.S. Cl.
CPC ............. *B60N 2/02* (2013.01); *B60N 2/10* (2013.01); *B60N 2/18* (2013.01); *B60N 2/1839* (2013.01); *B60N 2/2222* (2013.01); *B60N 2/66* (2013.01); *B60N 2002/022* (2013.01); *B60N 2002/0208* (2013.01); *B60N 2002/0212* (2013.01); *B60N 2002/0216* (2013.01)

(58) Field of Classification Search
CPC ............. B60N 2/66; B60N 2002/0208; B60N 2002/0212; B60N 2002/0216; B60N 2002/022; A47C 1/024; A47C 1/0248; A47C 3/32; A47C 7/405; A47C 7/48
See application file for complete search history.

(56) References Cited

U.S. PATENT DOCUMENTS

| | | | |
|---|---|---|---|
| 6,428,101 B1* | 8/2002 | Bernstein | A47C 3/0255 108/48 |
| 7,506,910 B2* | 3/2009 | Leitner | B60N 2/0232 296/65.01 |
| 7,871,116 B2* | 1/2011 | Leitner | B60N 2/0232 296/65.01 |
| 9,045,058 B2* | 6/2015 | Katoh | B60N 2/48 |
| 2003/0137173 A1 | 7/2003 | Kinoshita et al. | |
| 2012/0175928 A1* | 7/2012 | Eber | A47C 3/0255 297/311 |
| 2014/0191550 A1* | 7/2014 | Katoh | B60N 2/48 297/337 |
| 2015/0266448 A1* | 9/2015 | Aoki | B60R 22/20 297/313 |
| 2015/0343924 A1* | 12/2015 | Takeuchi | B60N 2/39 297/314 |

\* cited by examiner

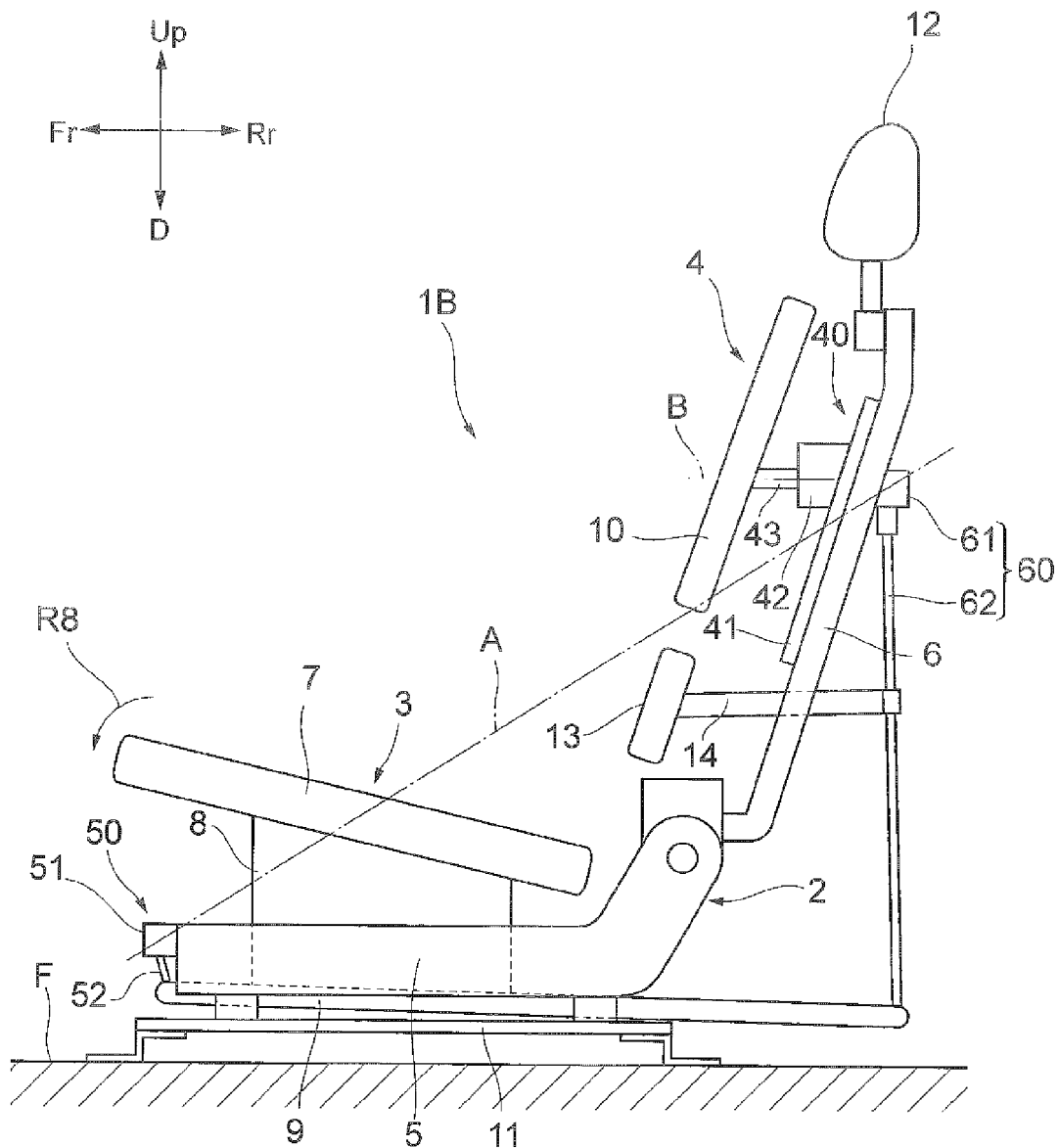

SEAT

CROSS-REFERENCE TO RELATED APPLICATION

This is a national phase application based on the PCT International Patent Application No. PCT/JP2013/070080 filed Jul. 24, 2013, the entire contents of which are incorporated herein by reference.

TECHNICAL FIELD

The present invention relates to a seat.

BACKGROUND ART

In the related art, as disclosed in the International Publication No. WO2013/021497, a seat is known in which a seating part is supported to be pivotally movable with respect to a support member extending rearward and upward. The seat is configured so that a front side of the seating part is supported and a rear side thereof is in a freely movable state. That is, the front side of the seating part is supported in a cantilever manner.

CITATION LIST

Patent Literature

[Patent Literature 1] International Publication No. WO2013/021497
[Patent Literature 2] Japanese Unexamined Utility Model Publication No. S63-40237
[Patent Literature 3] Japanese Unexamined Patent Application Publication No. 2006-199118
[Patent Literature 4] Japanese Unexamined Patent Application Publication No. 2012-166772
[Patent Literature 5] Japanese Unexamined Utility Model Publication No. H6-39565

SUMMARY OF INVENTION

Technical Problem

However, since the front side of the seating part is supported in the cantilever manner, it is difficult to ensure bearing capacity for a seating load of an occupant. In this case, to ensure bearing capacity tends to complicate the front side structure of the seating part to be miniaturized.

Therefore, the present invention aims to provide a seat that can ensure bearing capacity and miniaturize a support structure around a seating part including the front side of the seating part.

Solution to Problem

A seat according to the present invention includes a pivotally movable seating part, a pivotally movable backrest part independent from the seating part, a first supporter suspending and supporting a front side of the seating part, and a second supporter suspending a rear side of the seating part from a side behind the backrest part and supporting the seating part to be pivotally movable together with the first supporter.

According to the seat in the present invention, the front side and the rear side of the seating part are suspended and supported. Thus, compared to a seat in which the front side of a seating part is supported in a cantilever manner, the seat in the present invention can ensure bearing capacity for a seating load. The rear side of the seating part is suspended and supported from the side behind the backrest part. Accordingly, a support structure around the seating part including the front side of the seating part can be miniaturized.

Advantageous Effects of Invention

According to the present invention, it is possible to provide a seat that can ensure bearing capacity and miniaturize a support structure around a seating part including the front side of the seating part.

BRIEF DESCRIPTION OF DRAWINGS

FIG. 17 is a left side view illustrating a movement of the seat in response to a motion of the seated occupant when the vehicle is decelerated.

DESCRIPTION OF EMBODIMENTS

Figure 1:
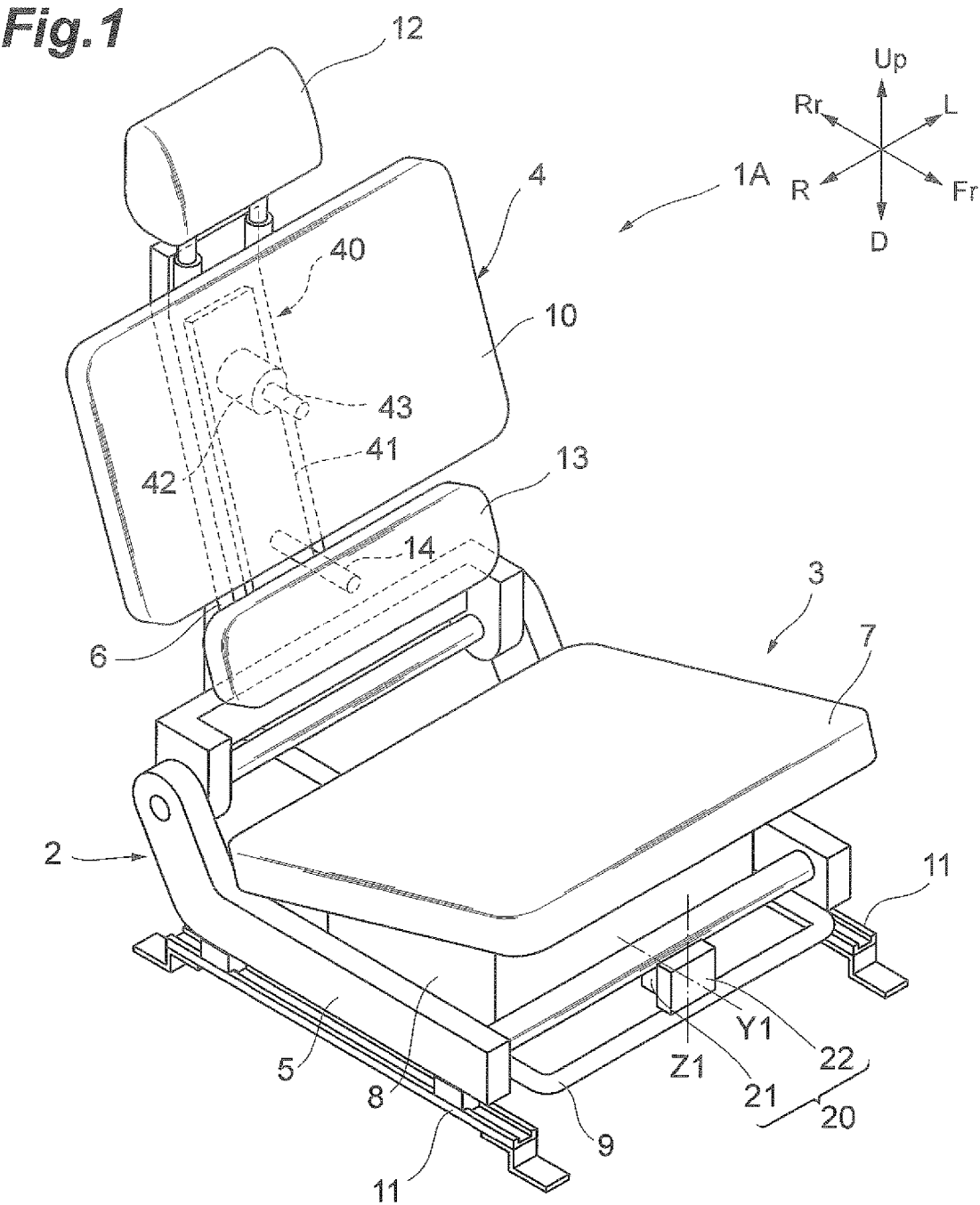
FIG. 1 is a perspective view schematically illustrating a seat according to a first embodiment of the present invention.

Hereinafter, referring to the accompanying drawings, embodiments according to the present invention will be described in detail. The same reference numerals will be given to the same elements when the drawings are described, and repeated description thereof will be omitted.

The seat according to the embodiment of the present invention is applied to a mobile body such as vehicles and aircrafts. Hereinafter, a vehicle seat will be described as an example. Accordingly, a leftward (L) and rightward (R) direction, a forward (Fr) and rearward (Rr) direction, and an upward (Up) and downward (D) direction of the seat are respectively coincident with a lateral direction, longitudinal direction, and a vertical direction of a vehicle.

First, a seat 1A according to a first embodiment of the present invention will be described with reference to FIGS. 1 to 8. In the drawings, in order to simplify a support structure of the seat 1A, seat covers or cushioning materials are omitted.

Figure 2:
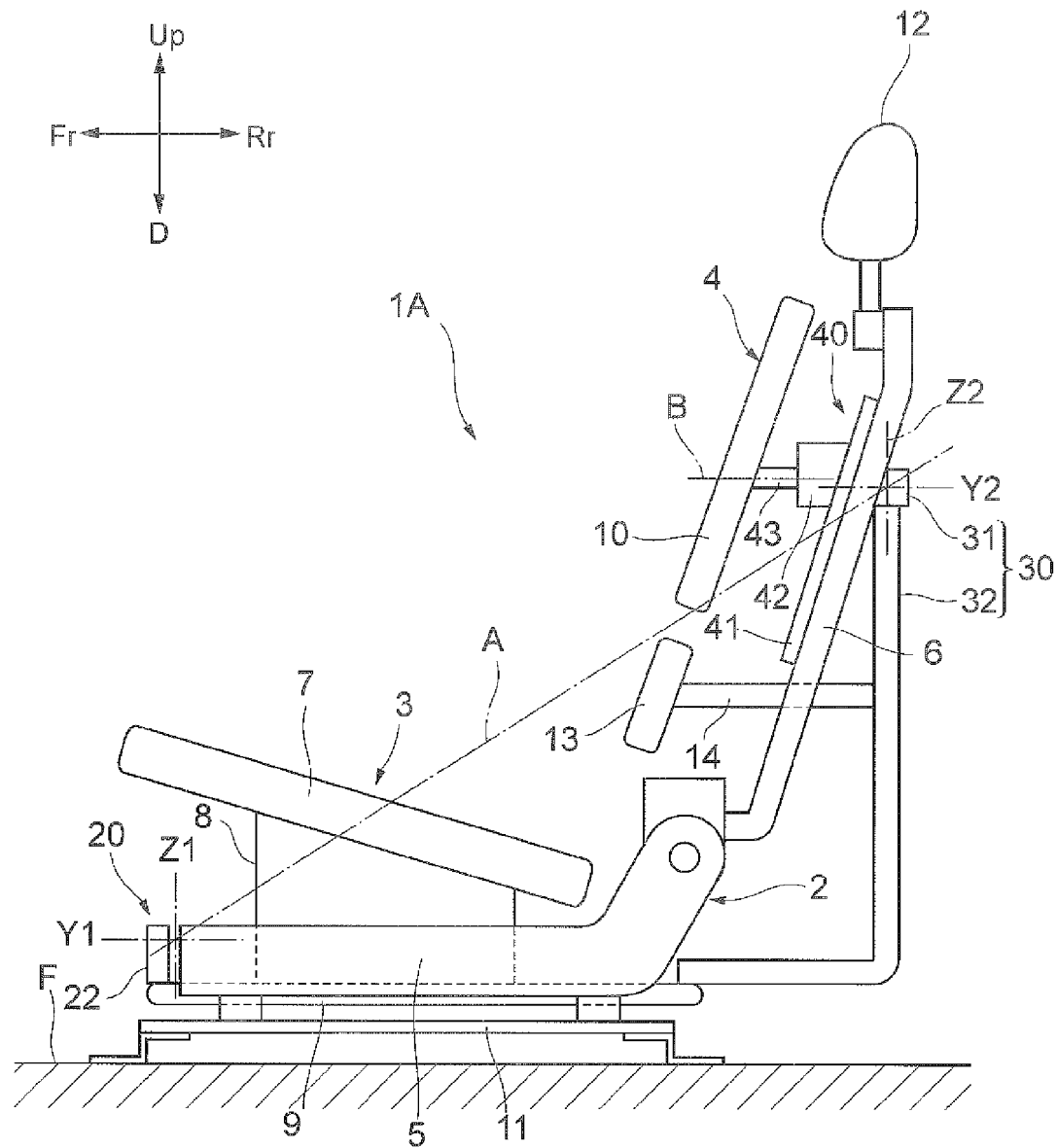
FIG. 2 is a left side view schematically illustrating the seat illustrated in FIG. 1.
Figure 3:
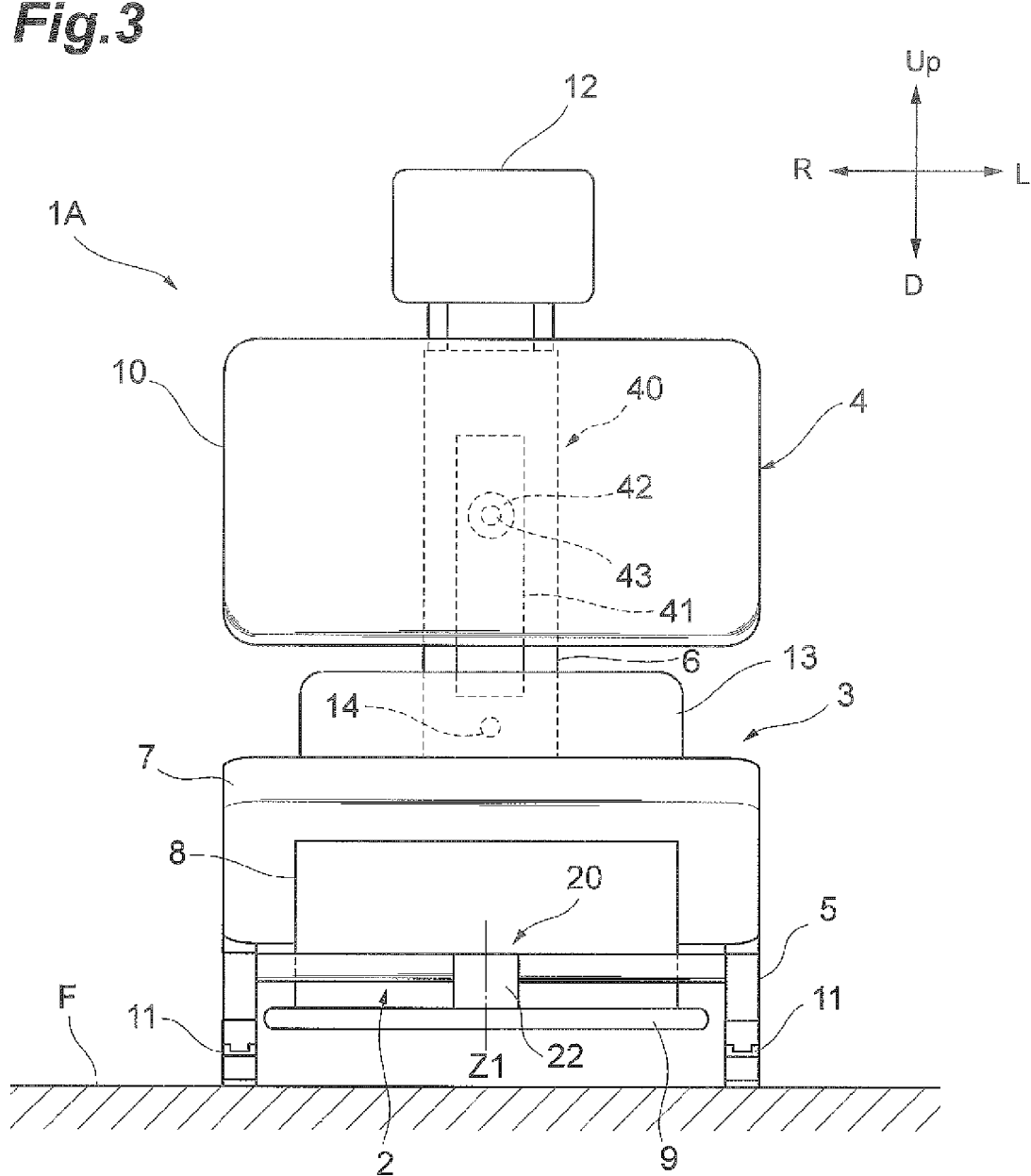
FIG. 3 is a front view schematically illustrating the seat illustrated in FIG. 1.
Figure 4:
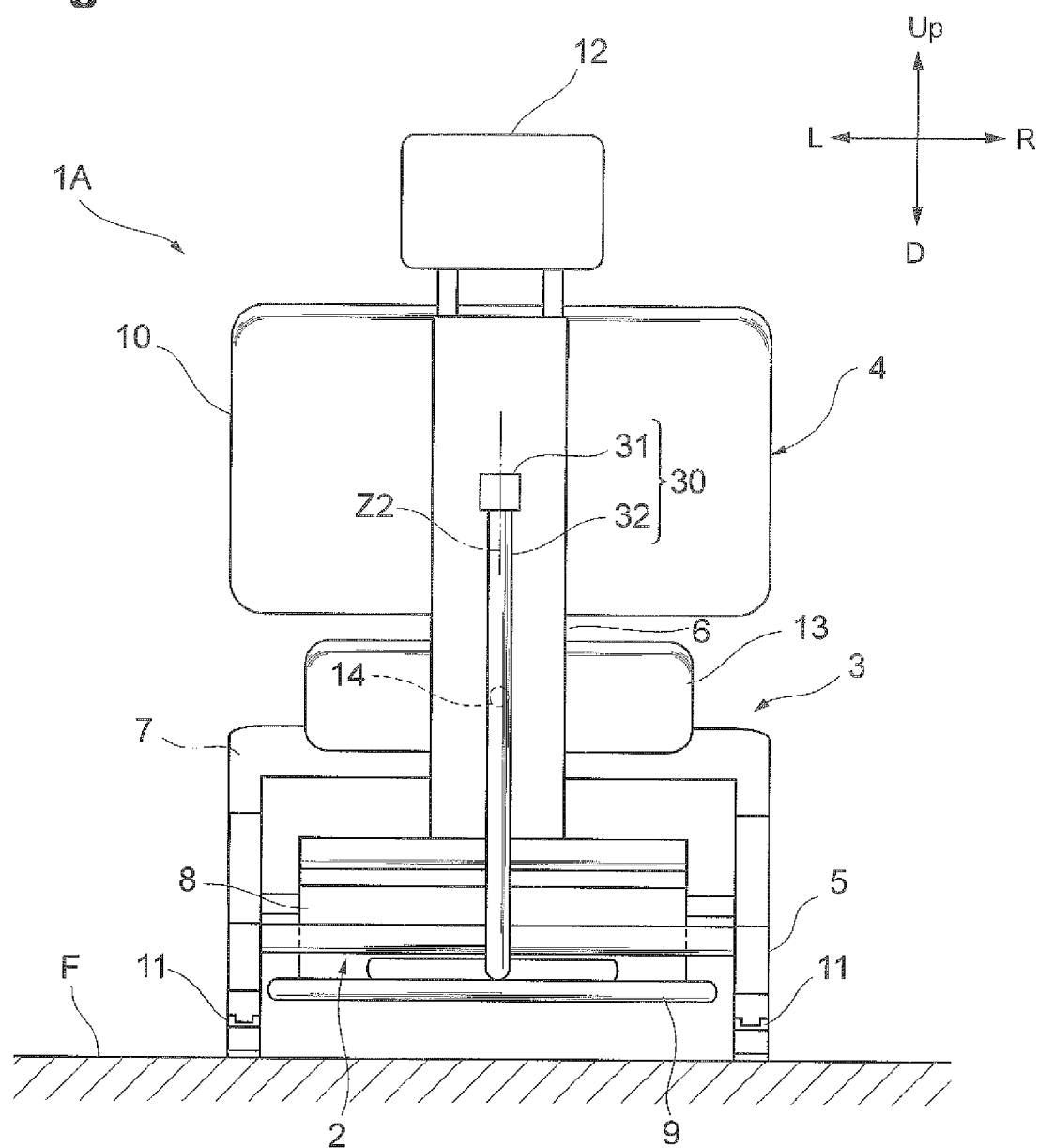
FIG. 4 is a rear view schematically illustrating the seat illustrated in FIG. 1.
Figure 5:
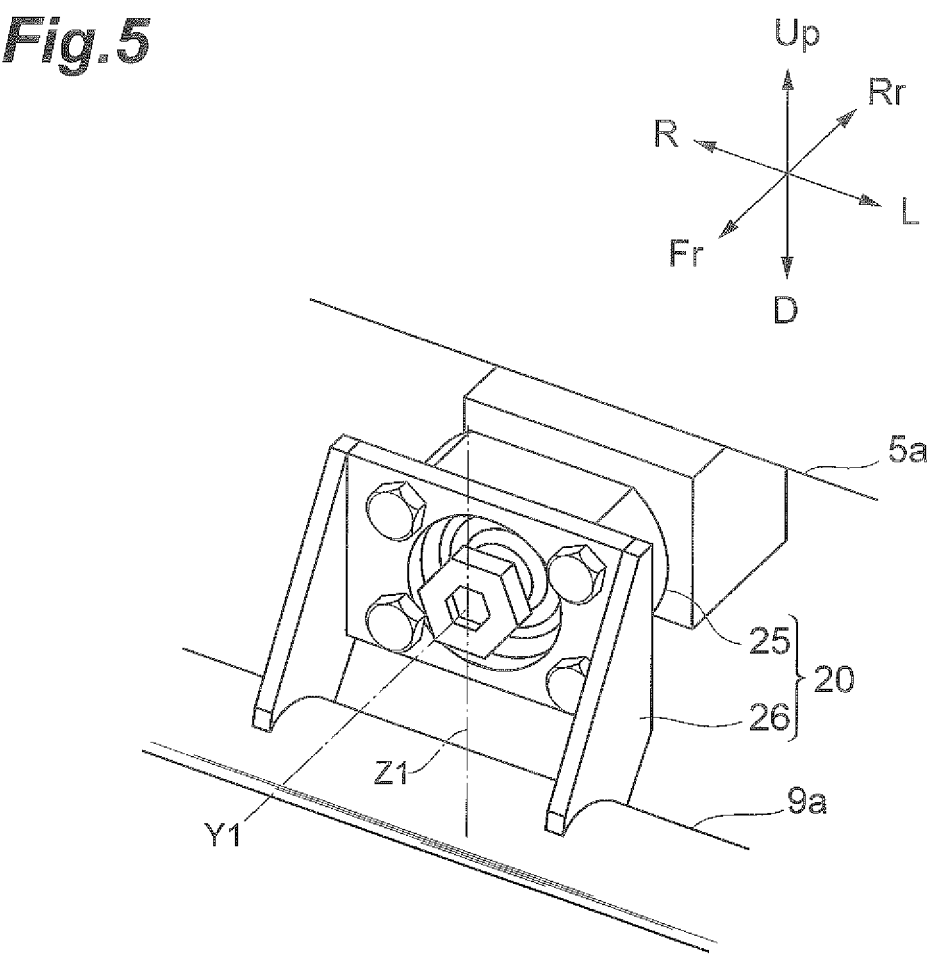
FIG. 5 is a perspective view illustrating a structure example of a first supporter according to the first embodiment.
Figure 6:
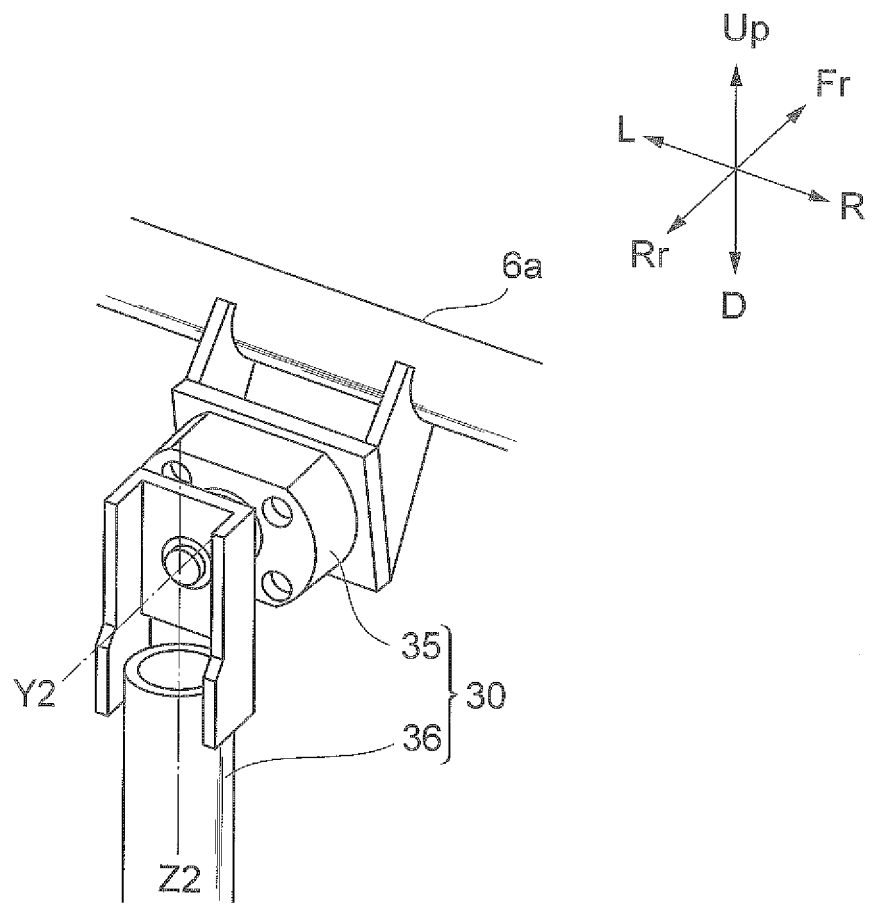
FIG. 6 is a perspective view illustrating a structure example of a second supporter according to the first embodiment.

FIG. 1 is a perspective view schematically illustrating the seat 1A according to the first embodiment of the present invention. FIG. 2 is a left side view schematically illustrating the seat 1A. FIG. 3 is a front view schematically illustrating the seat 1A. FIG. 4 is a rear view schematically illustrating the seat 1A. FIG. 5 is a perspective view illustrating a structure example of a first supporter 20 according to the first embodiment. FIG. 6 is a perspective view illustrating a structure example of a second supporter 30 according to the first embodiment.

Hereinafter, referring to FIGS. 1 to 4, an overall configuration of the seat 1A and details of each configuration will be sequentially described. The seat 1A has a frame 2 forming a skeletal structure of the seat 1A, a seating part 3 configured to support the pelvis periphery and the thighbone periphery of an occupant sitting on the seat 1A, and a backrest part 4 for supporting the scapula periphery of the occupant.

The frame 2 has a lower frame 5 supporting the seating part 3, and a rear frame 6 supporting the backrest part 4. The lower frame 5 is configured as a rectangular frame in a top view, and is arranged parallel or substantially parallel to a floor F of the vehicle. The lower frame 5 is attached to a pair of rails 11 and 11 fixed to the floor F so as to be slidable in the longitudinal direction. The rear frame 6 is configured as a rectangular frame in a front view, and arranged so as to extend rearward and upward in a side view. A lower end of the rear frame 6 is pivotally supported by a rear end of the lower frame 5, and the rear frame 6 can be tilted with respect to the lower frame 5. A headrest 12 is attached to an upper end of the rear frame 6.

The seating part 3 has a seating surface section 7 extending rearward and downward, a base section 8 elastically supporting the seating surface section 7, and a seat frame 9 supporting the base section 8. The seat frame 9 is configured as a rectangular frame that is smaller than the lower frame 5 in a top view, and is arranged in a space of the frame of the lower frame 5. The base section 8 is configured to have a rectangular shape in a front view and a trapezoidal shape in a side view, and is fixed above the seat frame 9. The seating surface section 7 is configured to have a rectangular shape in a top view, and is fixed above the base section 8. The backrest part 4 has a backrest surface section 10 extending rearward and upward, and a backrest frame (not illustrated) supporting the backrest surface section 10. The backrest surface section 10 is configured to have a rectangular shape in a front view, and is arranged above and behind the seating part 3.

The first supporter 20 suspending and supporting a front side of the seating part 3 is disposed on the lower frame 5. The second supporter 30 suspending a rear side of the seating part 3 from a side behind the backrest part 4 and supporting the seating part 3 to be pivotally movable (or swingable) together with the first supporter 20 is disposed on the rear frame 6. A third supporter 40 supporting the backrest part 4 is disposed on the rear frame 6.

The first supporter 20 has a first joint portion 21 fixed to a laterally central portion of a front section of the lower frame 5, and a first suspension portion 22 whose upper end is coupled to the first joint portion 21 and whose lower end is fixed to a laterally central portion of a front section of the seat frame 9.

For example, as illustrated in FIG. 5, the first supporter 20 is configured to include a ball joint 25 that is an example of the first joint portion 21 and a coupling member 26 that is an example of the first suspension portion 22. The ball joint 25 protrudes forward from a laterally central portion of a frame member 5a configuring the lower frame 5 and extending in the lateral direction. The coupling member 26 is arranged above and behind a frame member 9a configuring the seat frame 9 and extending in the lateral direction, and couples a front portion of the ball joint 25 and the laterally central portion of the frame member 9a to each other. The coupling member 26 is a U-shaped member open forward in a top view, and a front portion thereof is fixed to the frame member 9a.

The coupling member 26 is coupled to the ball joint 25 so as to be rotatable around at least rotation axes Y1 and Z1. The rotation axis Y1 extends in the longitudinal direction with passing through the center of the ball joint 25, and the rotation axis Z1 extends in the vertical direction with passing through the center of the ball joint 25.

As illustrated in FIGS. 1 to 4, the second supporter 30 has a second joint portion 31 fixed to the laterally central portion of the rear section of the rear frame 6, and a second suspension portion 32 whose upper end is coupled to the second joint portion 31 and whose lower end is fixed to the rear section of the seat frame 9.

For example, as illustrated in FIG. 6, the second supporter 30 is configured to include a ball joint 35 that is an example of the second joint portion 31 and a coupling member 36 that is an example of the second suspension portion 32. The ball joint 35 protrudes rearward from a laterally central portion of a frame member 6a configuring the rear frame 6 and extending in the lateral direction. The coupling member 36 is arranged above and behind the seat frame 9, and couples a rear portion of the ball joint 35 and the rear section of the seat frame 9 to each other. The coupling member 36 is configured so that a lower portion thereof is bent forward in an L-shape with respect to an upper portion thereof in a side view and a front end of the lower portion is fixed to the seat frame 9. The coupling member 36 may be configured as a columnar member instead of the L-shaped member.

The coupling member 36 is coupled to the ball joint 35 so as to be rotatable around at least rotation axes Y2 and Z2. The rotation axis Y2 extends in the longitudinal direction with passing through the center of the ball joint 35, and the rotation axis Z2 extends in the vertical direction with passing through the center of the ball joint 35. The rotation axis Z2 may be tilted within a range of approximately ±15° from the vertical direction in a side view.

In the seat 1A, the front side and the rear side of the seating part 3 are suspended and supported by the first supporter 20 and the second supporter 30. Accordingly, compared to a seat in which the front side of a seating part is supported in a cantilever manner, the seat 1A can ensure bearing capacity for a seating load. In addition, the rear side of the seating part 3 is suspended and supported from the side behind the backrest part 4 by the second supporter 30.

Accordingly, the support structure around the seating part 3 including the front side of the seating part 3 can be miniaturized.

As illustrated in FIGS. 1 to 4, the third supporter 40 has a sliding plate 41 slidably supported in the vertical direction with respect to the front section of the rear frame 6. The third supporter 40 further has a bearing 42 fixed to the sliding plate 41, and a support member 43 whose front end is fixed to the rear side of the backrest part 4 and whose rear end is rotatably coupled to the bearing 42.

The seat 1A further has a waist rest part 13 supporting the waist periphery of the occupant sitting on the seat 1A. The waist rest part 13 has a waist rest surface portion extending rearward and upward in a side view, and a waist rest frame supporting the waist rest surface portion. The waist rest surface portion and the waist rest frame are not illustrated. The waist rest part 13 is configured to have a rectangular shape in a front view. The waist rest part 13 is supported by the second supporter 30, particularly by the second suspension portion 32, so as to be pivotally movable in accordance with the pivot movement of the seating part 3. The waist rest part 13 is supported by the second suspension portion 32 via the support member 14 in a state where a longitudinal position thereof and a tilting angle thereof from the vertical direction in a side view are adjustable.

Here, a virtual axis A connecting a support point of the first supporter 20 and a support point of the second supporter 30 to each other is set so as to pass through the waist periphery of the occupant sitting on the seat 1A. The support points of the first and second supporters 20 and 30 respectively mean central portions of the first and second joint portions 21 and 31. The waist means the lumbar spine or a portion including the trunk muscle around the lumbar spine. The waist periphery means the waist and a portion around the waist. It is preferable to set the virtual axis A so as to be tilted rearward and upward from the vertical direction within a range of 60°±15°, for example.

A pivot axis B of the backrest part 4 is coincident with the longitudinal direction of the support member 43, is parallel or substantially parallel to the longitudinal direction, and is set so as to pass through the chest periphery of the occupant sitting on the seat 1A. The chest means the thoracic spine, or a portion including muscles around the thoracic spine. The chest periphery means the chest and a portion around the chest.

In the seat 1A, the first suspension portion 22 rotates around the rotation axis Y1 and the second suspension portion 32 rotates around the rotation axis Y2, and thereby the seating part 3 pivotally moves in a rolling direction of the vehicle and the right side and the left side of the seating part 3 move relatively in the vertical direction. In addition, the first suspension portion 22 rotates around the rotation axis Z1 and the second suspension portion 32 rotates around the rotation axis Z2, and thereby the seat unit 3 pivotally moves in a yaw direction of the vehicle and the right side and the left side of the seating part 3 move relatively in the longitudinal direction. Here, as described above, the rotation axis A is set so as to pass through the waist periphery of the occupant sitting on the seat 1A. Accordingly, the pelvis of the occupant together with the seat unit 3 is pivotally movable around the virtual axis A in the rolling direction and the yaw direction of the vehicle.

In addition, in the seat 1A, the support member 43 rotates around the bearing 42, and thereby the backrest part 4 pivotally moves in the rolling direction of the vehicle and the right side and the left side of the backrest part 4 move relatively in the vertical direction. Here, as described above, the rotation axis B is set so as to pass through the chest periphery of the occupant sitting on the seat 1A. Accordingly, the scapula of the occupant together with the backrest part 4 is pivotally movable around the rotation axis B in the rolling direction of the vehicle.

In addition, in the seat 1A, in accordance with the pivot movement of the seating part 3 which is caused by the rotation of the first and second suspension portions 22 and 32, the right side and the left side of the waist rest part 13 supported by the second suspension portion 32 move relatively in the vertical direction and the longitudinal direction. Here, as described above, the rotation axis A is set so as to pass through the waist periphery of the occupant sitting on the seat 1A. Accordingly, with a state where the waist periphery is stably supported by the waist rest part 13, the pelvis of the occupant is pivotally movable around the virtual axis A in the rolling direction and the yaw direction of the vehicle.

Figure 7:
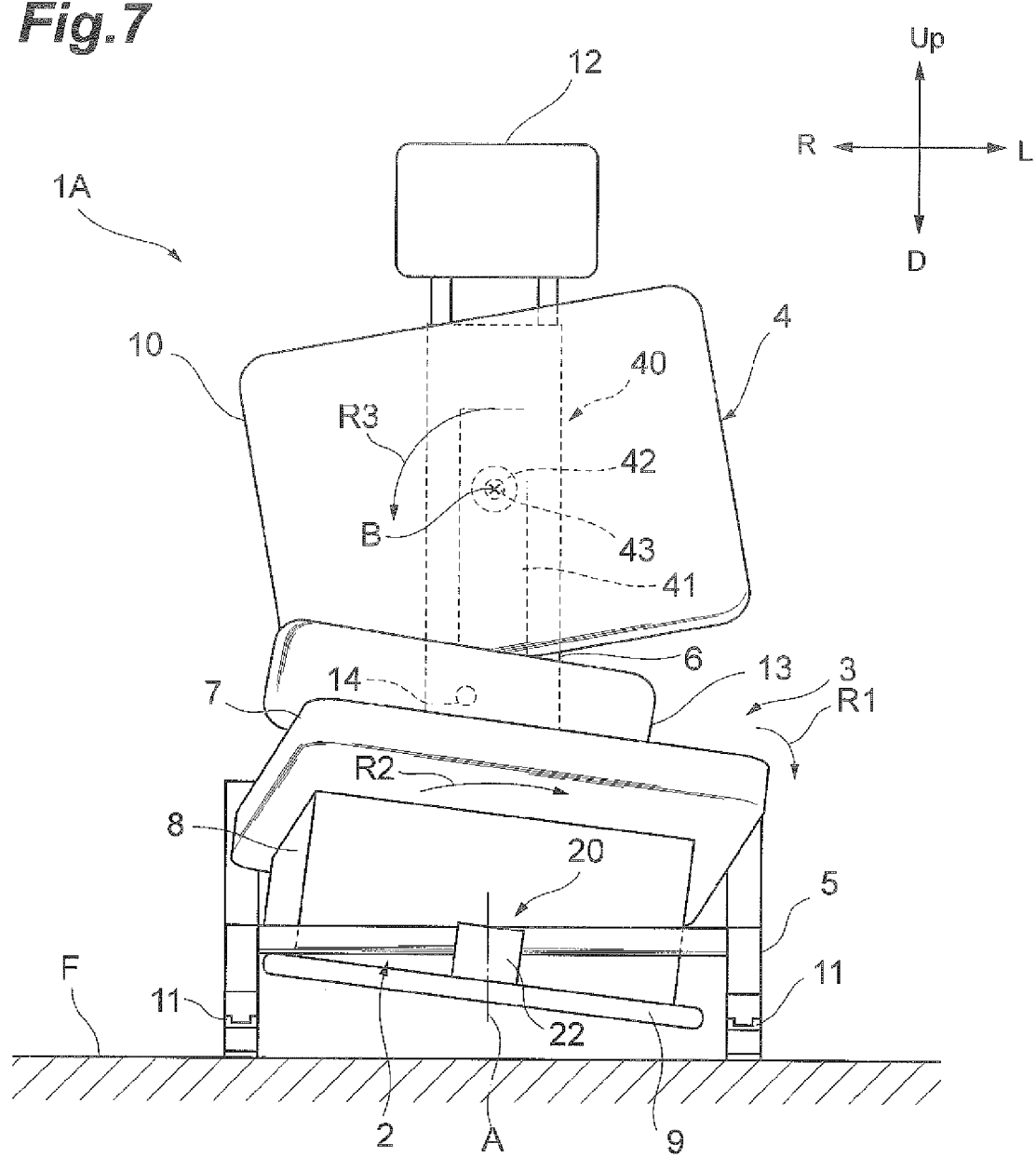
FIG. 7 is a front view illustrating a movement of the seat in response to a motion of a seated occupant when a vehicle is turned to the right.
Figure 8:
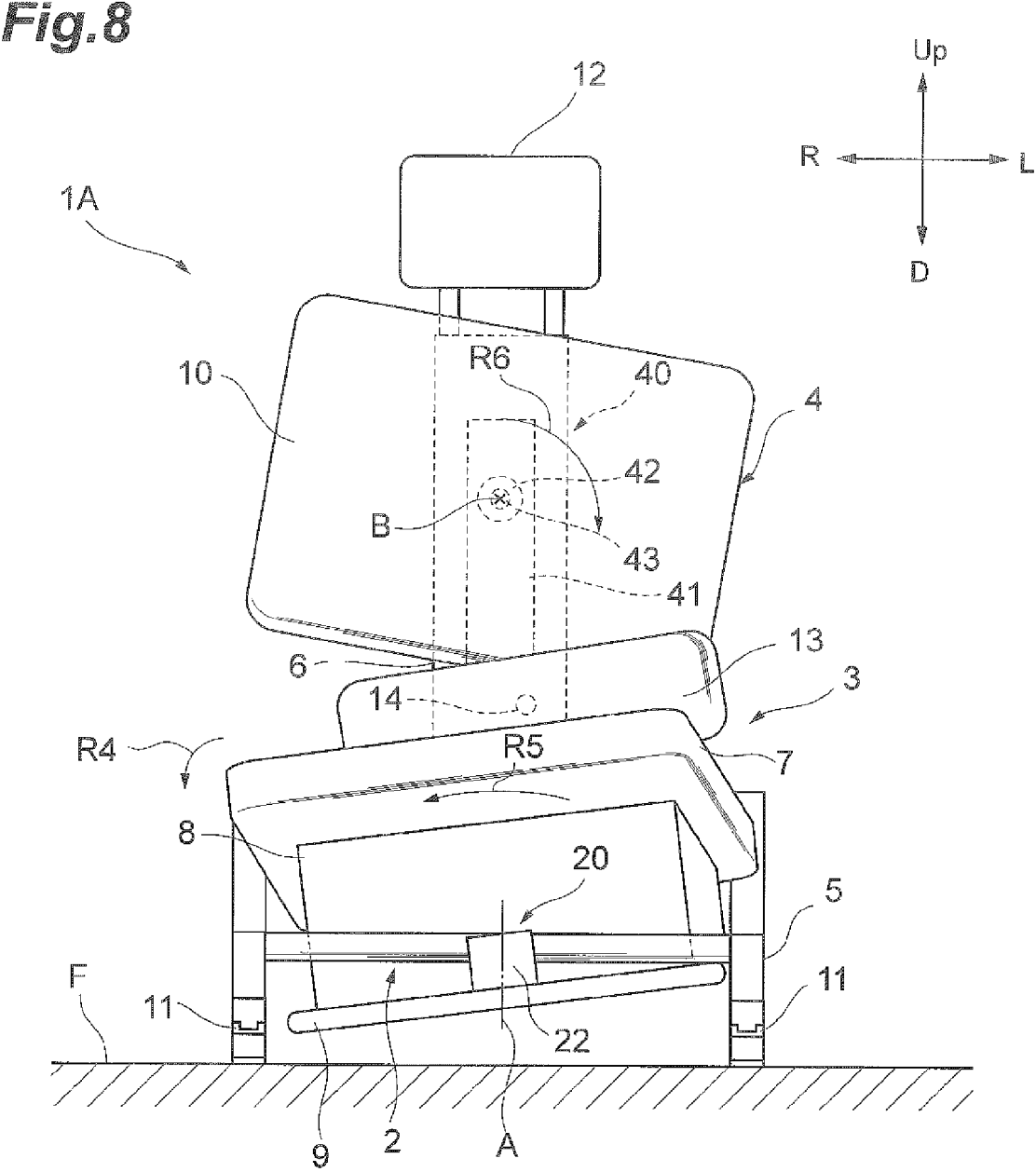
FIG. 8 is a front view illustrating a movement of the seat in response to a motion of the seated occupant when the vehicle is turned to the left.

Hereinafter, referring to FIGS. 7 and 8, movements of the seat 1A according to the first embodiment in response to motions of a seated occupant will be described. FIG. 7 is a front view illustrating a movement of the seat 1A in response to a motion of the seated occupant when a vehicle is turned to the right. FIG. 8 is a front view illustrating a movement of the seat 1A in response to a motion of the seated occupant when the vehicle is turned to the left.

In the following description, a direction expressed as a clockwise or counterclockwise direction around the rotation axis Y1 or the rotation axis Y2 is a direction in a front view. Similarly, a direction expressed as a clockwise or counterclockwise direction around the rolling direction is a direction in a front view. A direction expressed as a clockwise or counterclockwise direction around the rotation axis Z1 or the rotation axis Z2 is a direction in a top view. Similarly, a direction expressed as a clockwise or counterclockwise direction around the yaw direction is a direction in a top view.

The occupant who tries to turn the vehicle rotates a steering wheel. At this time, the occupant adopts a posture in which the turning direction side shoulder moves downward relative to the counter-turning direction side shoulder, and the turning direction side shoulder moves rearward relative to the counter-turning direction side shoulder. The counter-turning direction means a direction opposite to the turning direction.

At this time, a steering operation can be comfortably performed if the occupant bends the lumbar spine, shortens a distance between the counter-turning direction side pelvis and the shoulder compared to a distance between the turning direction side pelvis and the shoulder, twists the lumbar spine, and pivotally moves the pelvis in a direction opposite to the shoulder. For this reason, the occupant consciously or unconsciously tries to pivotally move the pelvis and the shoulder in opposite directions.

The occupant who tries to turn the vehicle to the right uses the trunk muscle so as to bend the lumbar spine. The occupant tries to pivotally move the pelvis clockwise in the rolling direction and tries to pivotally move the shoulder counterclockwise in the rolling direction. In addition, the occupant uses the trunk muscle so as to twist the waist. The occupant tries to pivotally move the pelvis counterclockwise in the yaw direction.

At this time, the first suspension portion 22 rotates clockwise around the rotation axis Y1, and the second suspension portion 32 rotates clockwise around the rotation axis Y2. Then, as illustrated in FIG. 7, in response to a motion of the pelvis, the seating part 3 is rotatably moved clockwise (direction of an arrow R1) in the rolling direction, and is brought into a state where the right side of the seating part 3 moves upward relative to the left side of the seating part 3. In this manner, the pelvis of the occupant sitting on the seat 1A is pivotally moved in the rolling direction of the vehicle, and is brought into a state where the right side of the pelvis is moved upward relative to the left side of the pelvis.

In addition, the first suspension portion 22 rotates counterclockwise around the rotation axis Z1, and the second suspension portion 32 rotates counterclockwise around the rotation axis Z2. Then, in response to a motion of the pelvis, the seating part 3 is rotatably moved counterclockwise (direction of an arrow R2) in the yaw direction, and is brought into a state where the right side of the seating part 3 moves forward relative to the left side of the seating part 3. In this manner, the pelvis of the occupant sitting on the seat 1A is pivotally moved in the yaw direction of the vehicle, and is brought into a state where the right side of the pelvis is moved forward relative to the left side of the pelvis.

In addition, the support member 43 rotates counterclockwise in a front view of the seat 1A. Then, in response to a motion of the scapula which is caused by a motion of the shoulder, the backrest part 4 is pivotally moved counterclockwise (direction of an arrow R3) in the rolling direction, and is brought into a state where the right side of the backrest part 4 moves downward relative to the left side of the backrest part 4. In this manner, the scapula of the occupant sitting on the seat 1A is pivotally moved in the rolling direction of the vehicle, and is brought into a state where the right side of the scapula is moved downward relative to the left side of the scapula.

In addition, in response to the pivot movement of the seating part 3, the waist rest part 13 is pivotally moved in the rolling direction and the yaw direction, and is brought into a state where the right side of the waist rest part 13 moves upward and forward relative to the left side of the waist rest part 13. In this manner, the pelvis of the occupant sitting on the seat 1A moves in a state where the waist periphery is stably supported by the waist rest part 13.

Then, the occupant who tries to turn the vehicle to the right uses the trunk muscle so as to bend the lumbar spine. The occupant is brought into a state where the pelvis is pivotally moved clockwise in the rolling direction, and is brought into a state where the shoulder is pivotally moved counterclockwise in the rolling direction. In addition, the occupant uses the trunk muscle so as to twist the waist, and is brought into a state where the pelvis is pivotally moved counterclockwise in the yaw direction. In this manner, the occupant pivotally moves the pelvis and the shoulder in opposite directions, thereby enabling the occupant to comfortably perform a steering operation during the right turn.

On the other hand, the occupant who tries to turn the vehicle to the left tries to pivotally move the pelvis and the shoulder in the direction opposite to the direction during the right turn. As illustrated in FIG. 8, in response to a motion of the pelvis, the seating part 3 is rotatably moved counterclockwise (direction of an arrow R4) in the rolling direction, and is brought into a state where the right side of the seating part 3 moves downward relative to the left side of the seating part 3. In addition, in response to a motion of the pelvis, the seating part 3 is rotatably moved clockwise (direction of an arrow R5) in the yaw direction, and is brought into a state where the right side of the seating part 3 moves rearward relative to the left side of the seating part 3.

In addition, in response to the pivot movement of the seating part 3, the waist rest part 13 is pivotally moved in the rolling direction and the yaw direction, and is brought into a state where the right side of the waist rest part 13 moves downward and rearward relative to the left side of the waist rest part 13. In addition, in response to a motion of the scapula which is caused by a motion of the shoulder, the backrest part 4 is pivotally moved clockwise (direction of an arrow R6) in the rolling direction, and is brought into a state where the right side of the backrest part 4 moves upward relative to the left side of the backrest part 4.

Then, the occupant who tries to turn the vehicle to the left uses the trunk muscle so as to bend the lumbar spine. The occupant is brought into a state where the pelvis is pivotally moved counterclockwise in the rolling direction, and is brought into a state where the shoulder is pivotally moved clockwise in the rolling direction. In addition, the occupant uses the trunk muscle so as to twist the waist, and is brought into a state where the pelvis is pivotally moved clockwise in the yaw direction. In this manner, the occupant pivotally moves the pelvis and the shoulder in opposite directions, thereby enabling the occupant to comfortably perform a steering operation during the left turn.

In this way, according to the seat 1A in the first embodiment, the front side and the rear side of the seating part 3 are suspended and supported. Accordingly, compared to a seat in which the front side of a seating part is supported in a cantilever manner, the seat 1A can ensure bearing capacity for a seating load. The rear side of the seating part 3 is suspended and supported from a side behind the backrest part 4. Accordingly, a support structure around the seating part 3 including the front side of the seating part 3 can be miniaturized.

In addition, a suspension support structure using the ball joints 25 and 35 and the coupling members 26 and 36 is employed, and the seating part 3 is supported so as to be pivotally movable in the rolling direction and the yaw direction of the vehicle. This can improve operability when a vehicle is turned.

Next, referring to FIGS. 9 to 17, a seat 1B according to a second embodiment of the present invention will be described. Hereinafter, description repeated from the first embodiment will be omitted.

Figure 9:
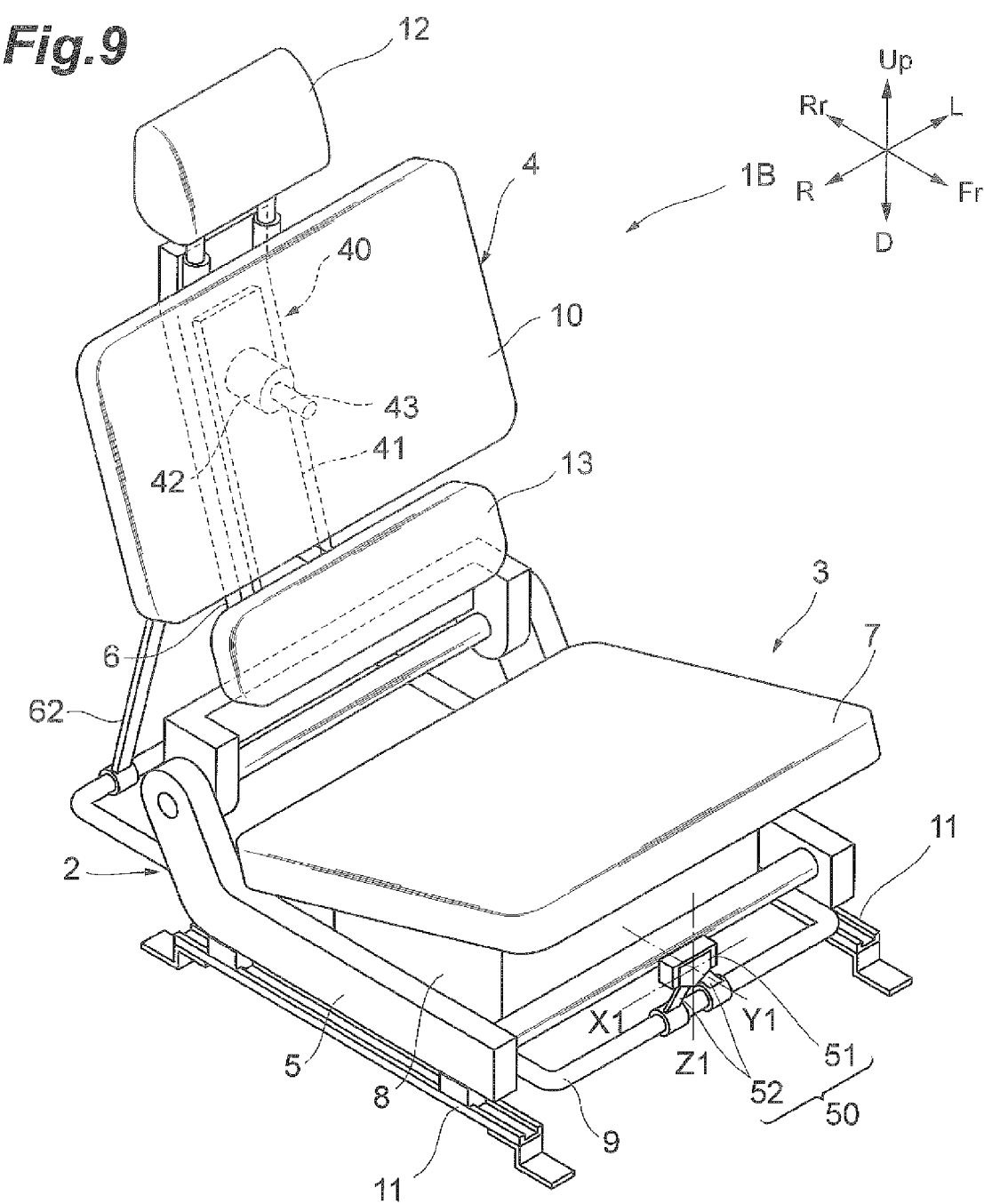
FIG. 9 is a perspective view schematically illustrating a seat according to a second embodiment of the present invention.
Figure 10:
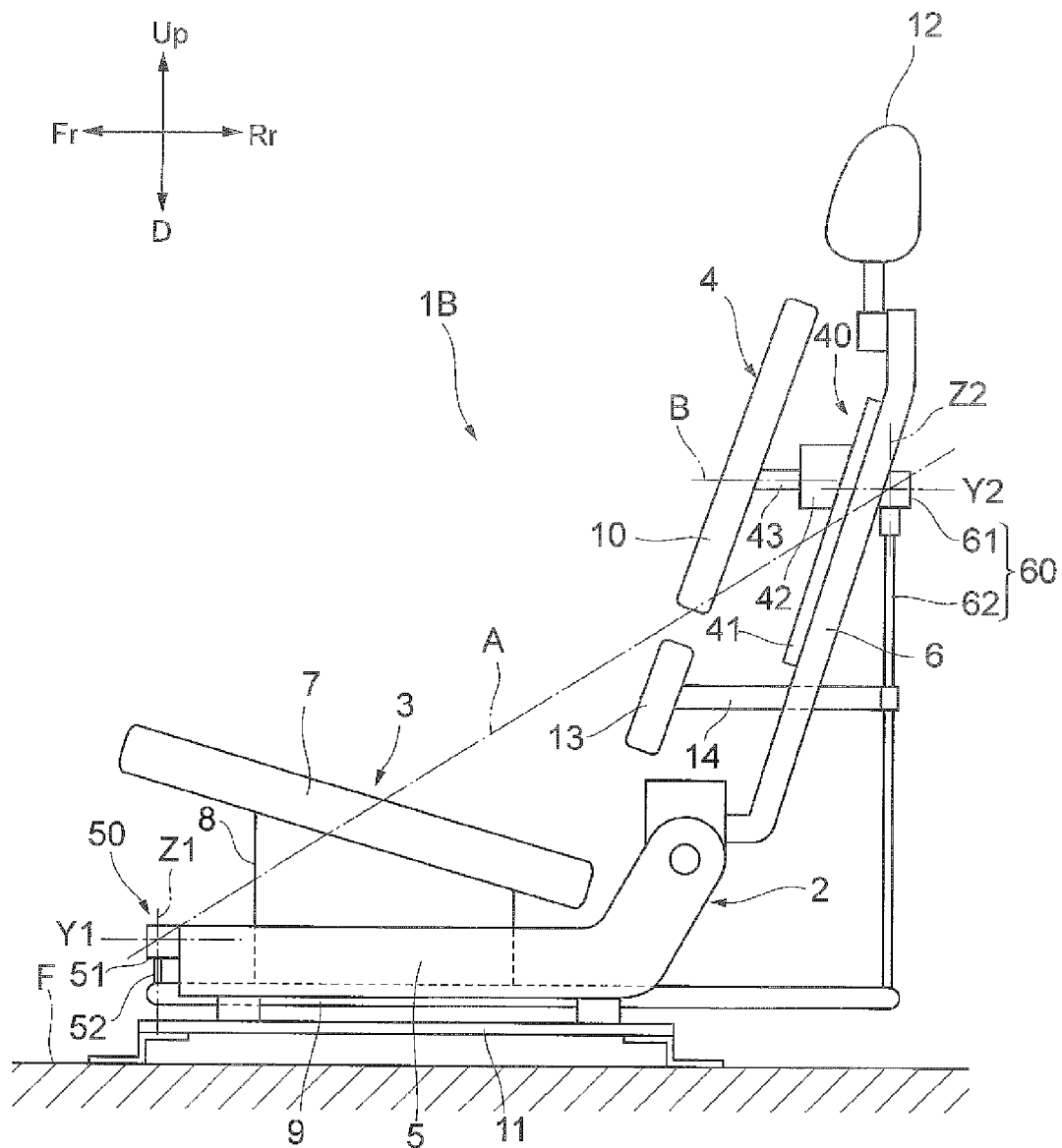
FIG. 10 is a left side view schematically illustrating the seat illustrated in FIG. 9.
Figure 11:
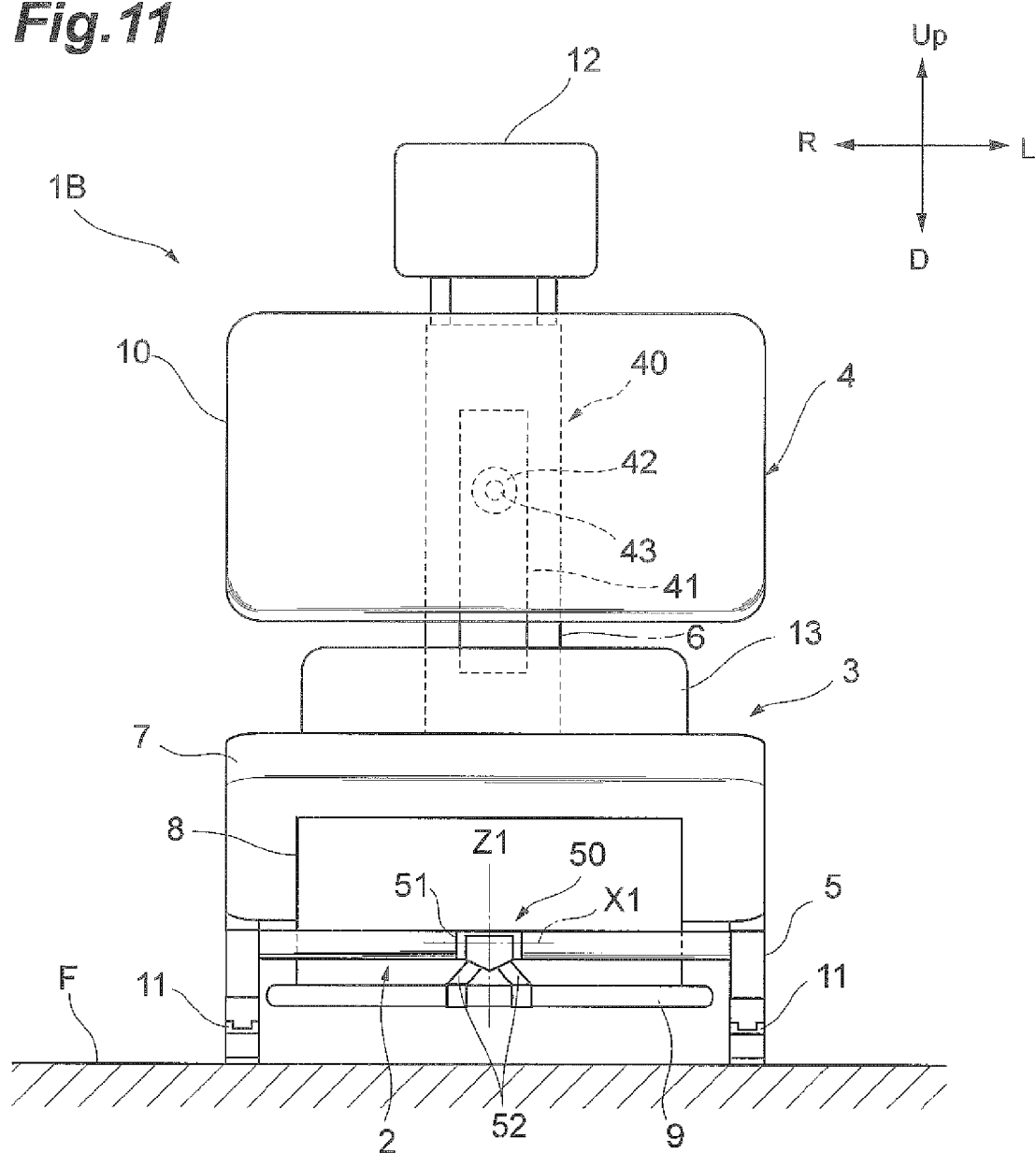
FIG. 11 is a front view schematically illustrating the seat illustrated in FIG. 9.
Figure 12:
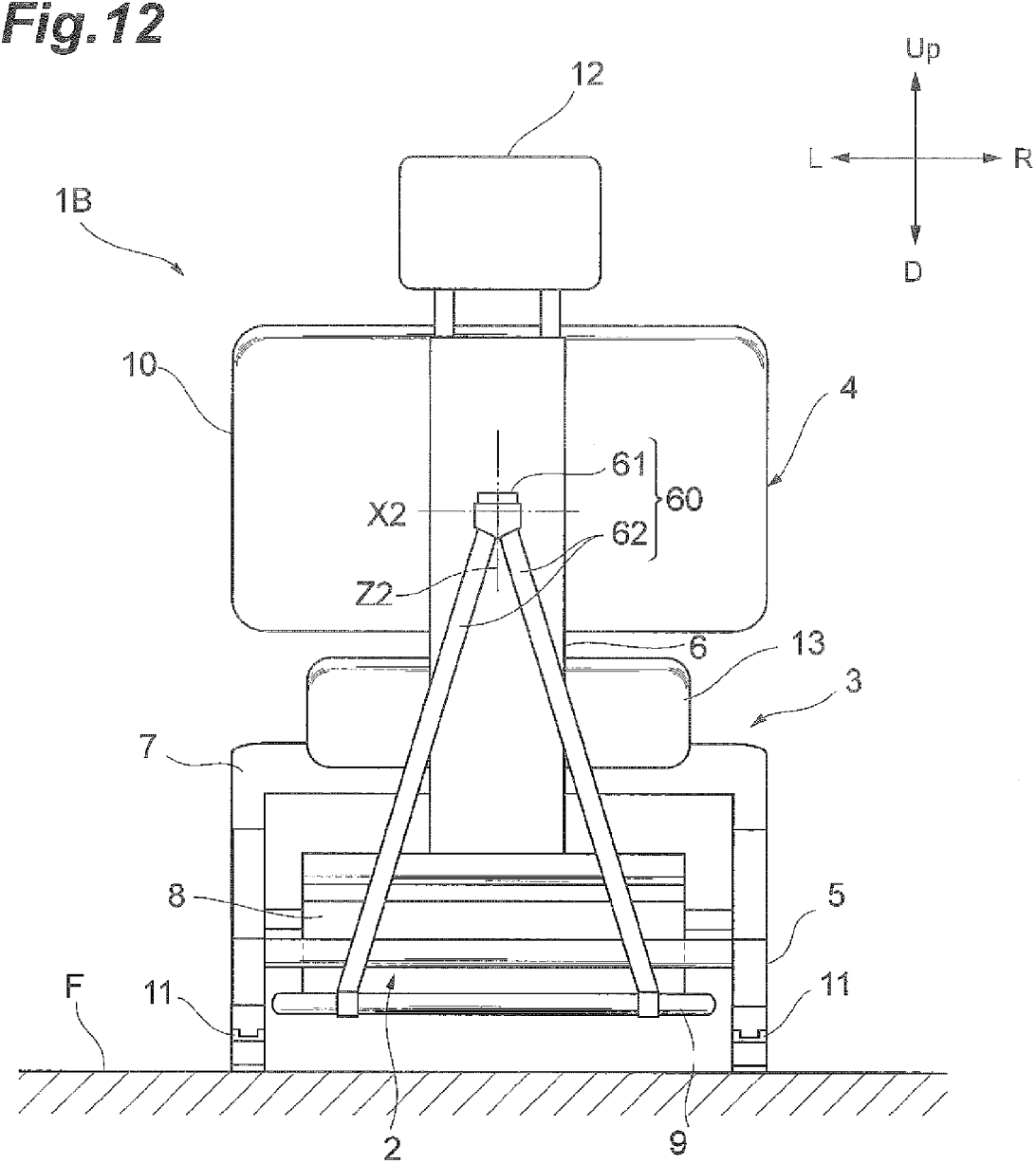
FIG. 12 is a rear view schematically illustrating the seat illustrated in FIG. 9.
Figure 13:
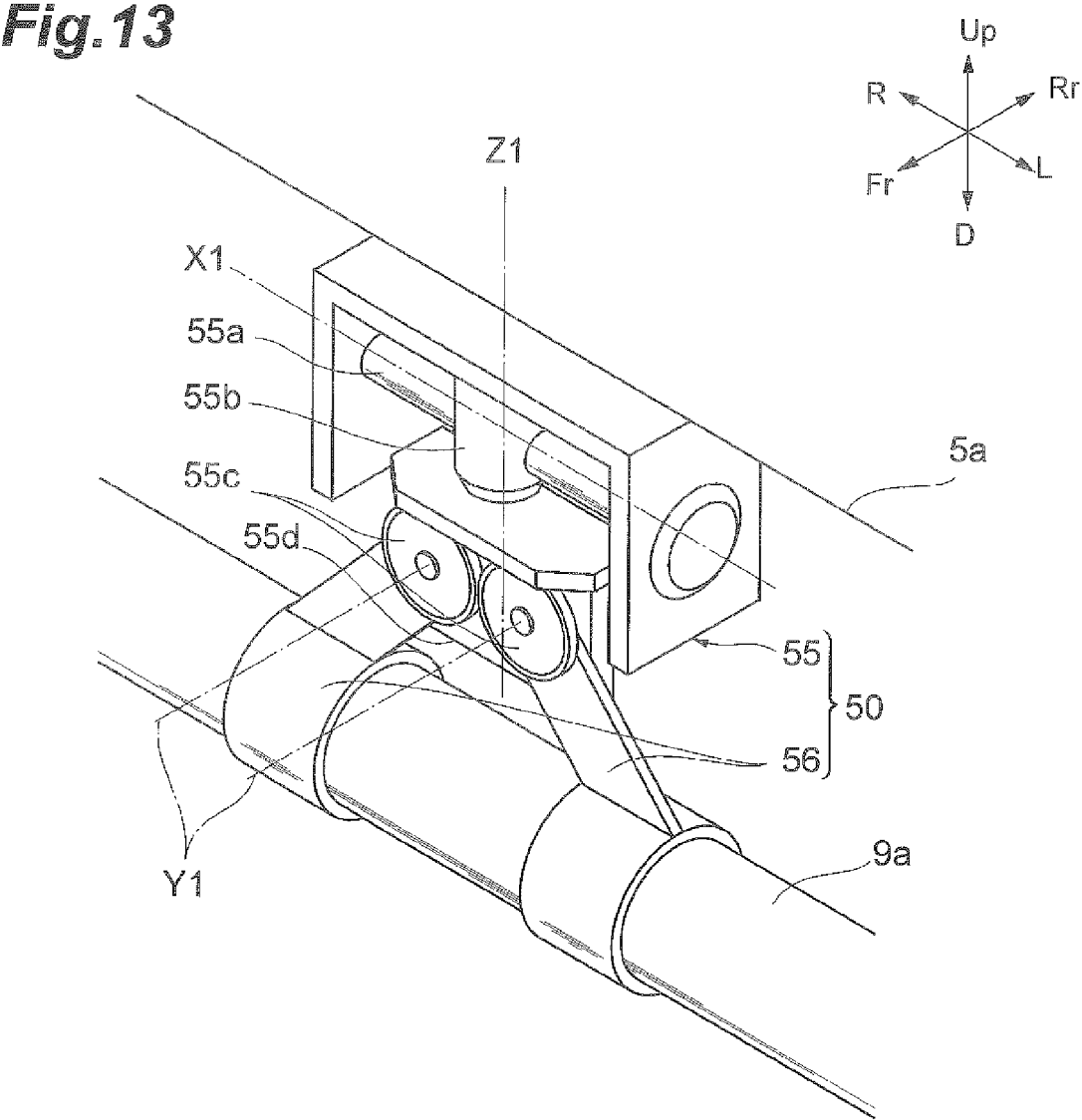
FIG. 13 is a perspective view illustrating a structure example of a first supporter according to the second embodiment.
Figure 14:
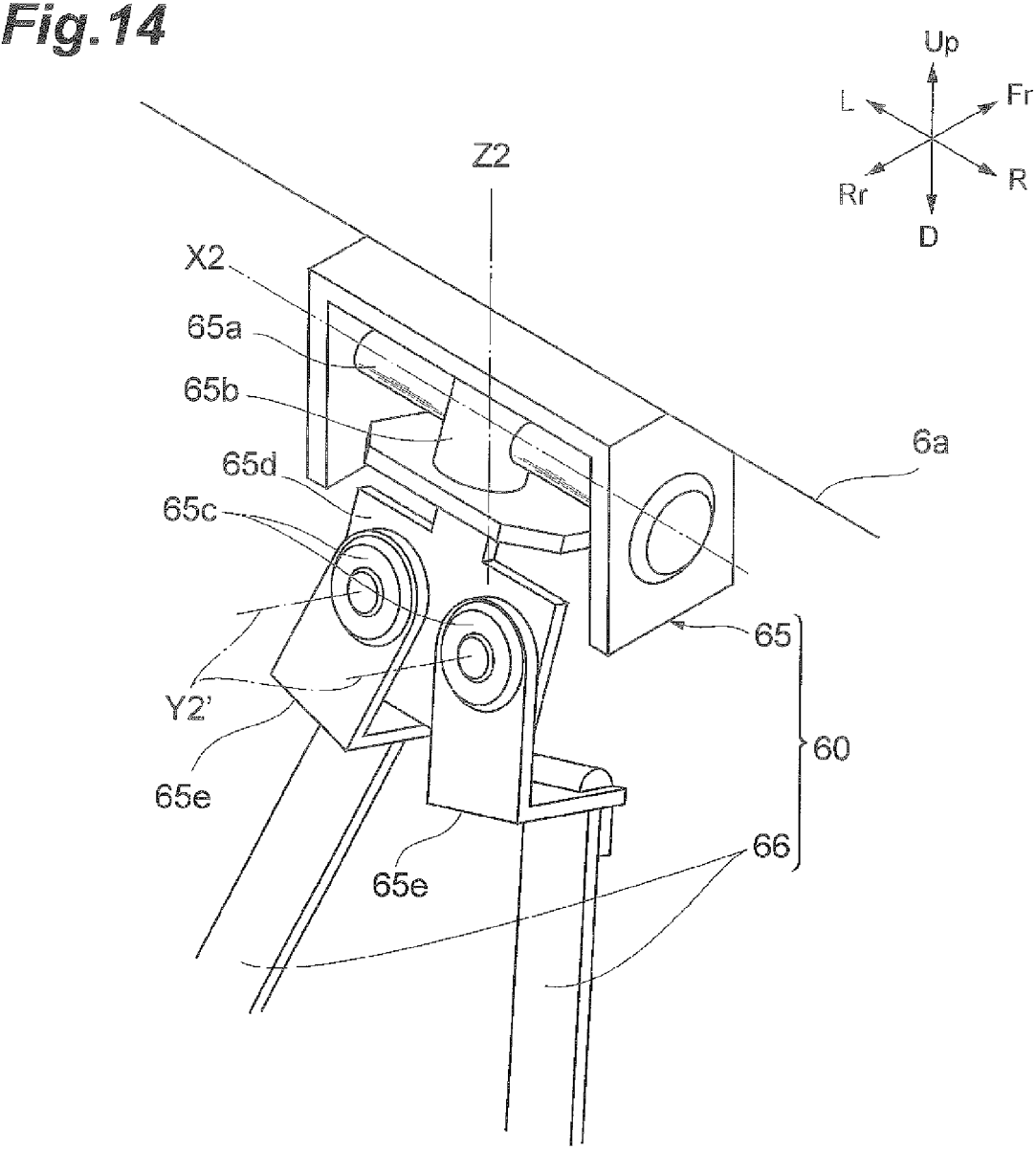
FIG. 14 is a perspective view illustrating a structure example of a second supporter according to the second embodiment.
Figure 15:
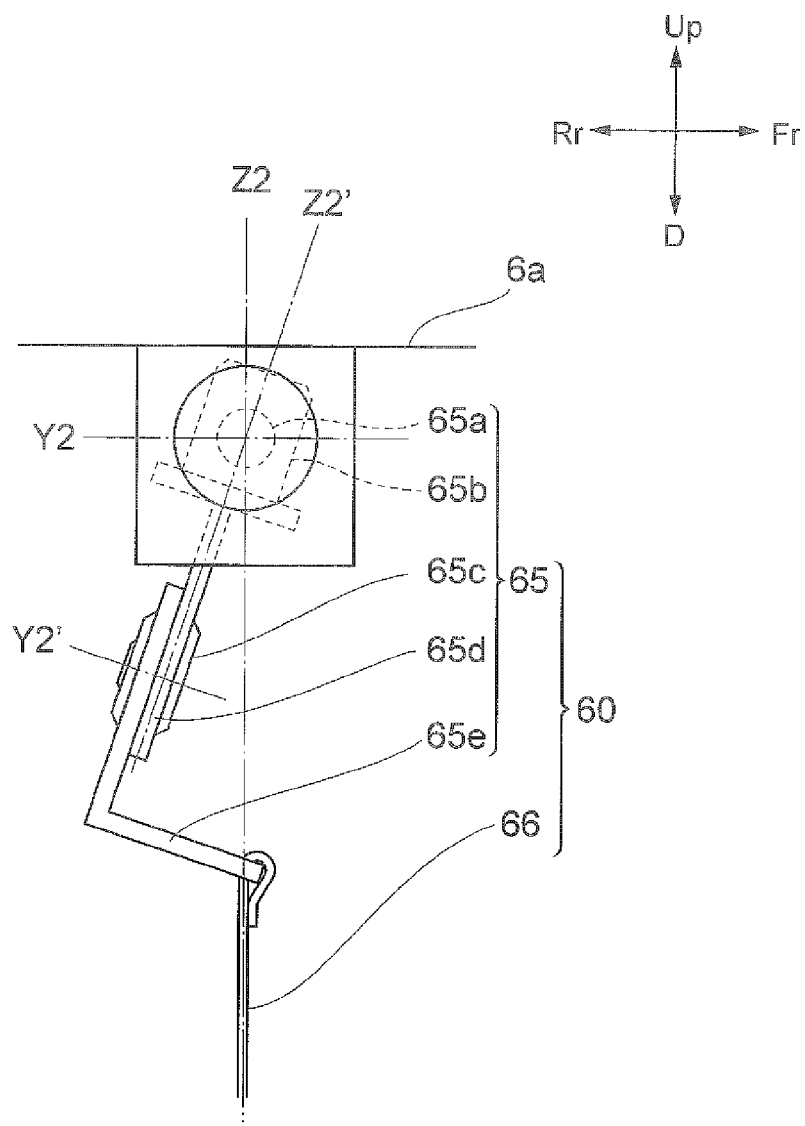
FIG. 15 is a right side view illustrating a structure example of the second supporter according to the second embodiment.

FIG. 9 is a perspective view schematically illustrating the seat 1B according to the second embodiment of the present invention. FIG. 10 is a left side view schematically illustrating the seat 1B. FIG. 11 is a front view schematically illustrating the seat 1B. FIG. 12 is a rear view schematically illustrating the seat 1B. FIG. 13 is a perspective view illustrating a structure example of a first supporter 50 according to the second embodiment. FIG. 14 is a perspective view illustrating a structure example of a second supporter 60 according to the second embodiment. FIG. 15 is a right side view illustrating a structure example of the second supporter 60 according to the second embodiment.

A configuration of the first supporter 50 and the second supporter 60 of the seat 1B according to the second embodiment is different from that of the seat 1A according to the first embodiment. As will be described later, the seat 1B employs a pair of belts 56 and 56 instead of the coupling member 26 of the seat 1A, and employs a pair of belts 66 and 66 instead of the coupling member 36.

As illustrated in FIGS. 9 to 12, the first supporter 50 has a first joint portion 51 fixed to the laterally central portion of the front section of the lower frame 5, and a first suspension portion 52 whose upper end is coupled to the first joint portion 51 and whose lower end is connected to the laterally central portion of the front section (frame member 9a in FIG. 13) of the seat frame 9.

For example, as illustrated in FIG. 13, the first supporter 50 is configured to include a compound joint 55 that is an example of the first joint portion 51 and the pair of belts 56 and 56 that are examples of the first suspension portion 52.

The compound joint 55 has a joint 55a arranged below in front of the laterally central portion of the frame member 5a configuring the lower frame 5 and extending in the lateral direction, a joint 55b arranged below the joint 55a, and a pair of joints 55c and 55c arranged below the joint 55b.

The joint 55a rotates the joint 55b and a retainer plate 55d holding the pair of joints 55c and 55c. The joint 55b rotates the retainer plate 55d. The pair of joints 55c and 55c rotate the pair of belts 56 and 56. The retainer plate 55d is arranged between the joints 55c and 55c in a state where the retainer plate 55d is rotatable in response to the rotation of the joint 55a or the rotation of the joint 55b.

The pair of belts 56 and 56 are arranged in an inverted V-shape in a front view above and behind the frame member 9a configuring the seat frame 9 and extending in the lateral direction, and couple the pair of joints 55c and 55c and the laterally central portion of the frame member 9a. The pair of belts 56 and 56 are wound around the frame member 9a at positions that are laterally symmetrical to the center of the frame member 9a.

The pair of belts 56 and 56 are coupled to the compound joint 55 so as to be rotatable around the rotation axes X1, Y1, and Z1. The rotation axis X1 extends in the lateral direction with passing through the joint 55a, and the rotation axis Z1 extends in the vertical direction with passing through the joint 55b. The rotation axes Y1 extend in the longitudinal direction with passing through the joints 55c and 55c.

As illustrated in FIGS. 9 to 12, the second supporter 60 has a second joint portion 61 fixed to the laterally central portion of the rear section of the rear frame 6, and a second suspension portion 62 whose upper end is coupled to the second joint portion 61 and whose lower end is connected to the rear section or a rear end portion of the seat frame 9 (refer to FIG. 10).

For example, as illustrated in FIGS. 14 and 15, the second supporter 60 is configured to include a compound joint 65 that is an example of the second joint portion 61 and the pair of belts 66 and 66 that are examples of the second suspension portion 62.

The compound joint 65 has a joint 65a arranged below the frame member 6a configuring the rear frame 6, a joint 65b arranged below the joint 65a, and a pair of joints 66c and 66c arranged below the joint 65b.

The joint 65a rotates the joint 65b and a retainer plate 65d holding the pair of joints 65c and 65c. The joint 65b rotates the retainer plate 65d. The pair of joints 65c and 65c rotate the pair of belts 66 and 66 via a pair of bent plates 65e and 65e coupled to the retainer plate 65d.

The retainer plate 65d is arranged between the joint 65b and the joints 65c and 65c so as to extend rearward and downward in a side view, in a state where the retainer plate 65d is rotatable in response to the rotation of the joint 65a or the rotation of the joint 65b. The bent plate 65e is an L-shaped member open forward in a side view. The bent plate 65e is configured to include a tilting section that tilts and extends rearward and downward along the retainer plate 65d in a side view, and a bent section that is bent and extends forward and downward from below the tilting section. The bent plate 65e is configured so that an upper end thereof is coupled to a lower portion of the retainer plate 65d and lower end thereof is connected to an upper end of the belt 66.

The pair of belts 66 and 66 are arranged in an inverted V-shape in a front view, above and behind the seat frame 9, and couple the compound joint 65 and the rear section of the seat frame 9 to each other. The pair of belts 66 and 66 are wound around the seat frame 9 at positions that are laterally symmetrical to the laterally central portion of the rear section of the seat frame 9. In order to stably ensure the rotation of the seating part 3, it is preferable that the pair of belts 66 and 66 are set to have an inverted V-shaped apex angle of 30° or greater.

The pair of belts 66 and 66 are coupled to the compound joint 65 so as to be rotatable around rotation axes X2, Y2', and Z2'. The rotation axis X2 extends in the lateral direction with passing through the joint 65a, and the rotation axis Z2' extends rearward and downward along the retainer plate 65d with passing through the joint 65b. The rotation axis Y2' extends perpendicular to the retainer plate 65d (orthogonal to the rotation axis Z2') with passing through the joint 65c. Therefore, the rotation axis Z2' tilts with respect to the rotation axis Z2 (corresponding to the pivot axis in the yaw direction) extending in the vertical direction, and the rotation axis Y2' tilts with respect to the rotation axis Y2 (corresponding to the pivot axis in the rolling direction) extending in the longitudinal direction.

In the seat 1B, the front side and the rear side of the seating part 3 are suspended and supported by the first supporter 50 and the second supporter 60. Accordingly, compared to a seat in which a front side of a seating part is supported in a cantilever manner, the seat 1B can ensure bearing capacity for a seating load. In addition, the rear side of the seating part 3 is suspended and supported from a side behind the backrest part 4 by the second supporter 60. Accordingly, a support structure around the seating part 3 including the front side of the seating part 3 can be miniaturized.

Here, the virtual axis A connecting a support point of the first supporter 50 and a support point of the second supporter 60 to each other is set so as to pass through the waist periphery of the occupant sitting on the seat 1B. In addition, the pivot axis B of the backrest part 4 is set so as to pass through the chest periphery of the occupant.

As illustrated in FIGS. 9 to 12, the seat 1B further has the pivotally movable waist rest part 13. The waist rest part 13 is supported by the second suspension section 60, particularly by the second suspension portion 62, so as to be pivotally movable in response to the pivot movement of the seating part 3.

In the seat 1B, the first suspension portion 52 rotates around the rotation axis X1 and the second suspension portion 62 rotates around the rotation axis X2, and thereby the seating part 3 pivotally moves in the pitch direction of the vehicle and the front side and the rear side of the seating part 3 move relatively in the longitudinal and vertical directions. Here, the retainer plate 65d and the bent plate 65e amplify the pivot movement in the pitch direction. In addition, the first suspension portion 52 rotates around the rotation axis Z1 and the second suspension portion 62 rotates around the rotation axis Z2', and thereby the seating part 3 pivotally moves in the yaw direction of the vehicle and the right side and the left side of the seating part 3 move relatively in the longitudinal direction.

In addition, the first suspension portion 52 rotates around the rotation axis Y1 and the second suspension portion 62 rotates around the rotation axis Y2', and thereby the seating part 3 pivotally moves in the rolling direction of the vehicle and the right side and the left side of the seating part 3 move relatively in the vertical direction. The pivot movement in the rolling direction is coordinated with the pivot movement in the yaw direction. In addition, in response to the pivot movement of the seating part 3 which is caused by the rotation of the first and second suspension portions 52 and 62, the right side and the left side of the waist rest part 13 supported by the second suspension portion 62 move relatively in the vertical direction and the longitudinal direction.

Figure 16:
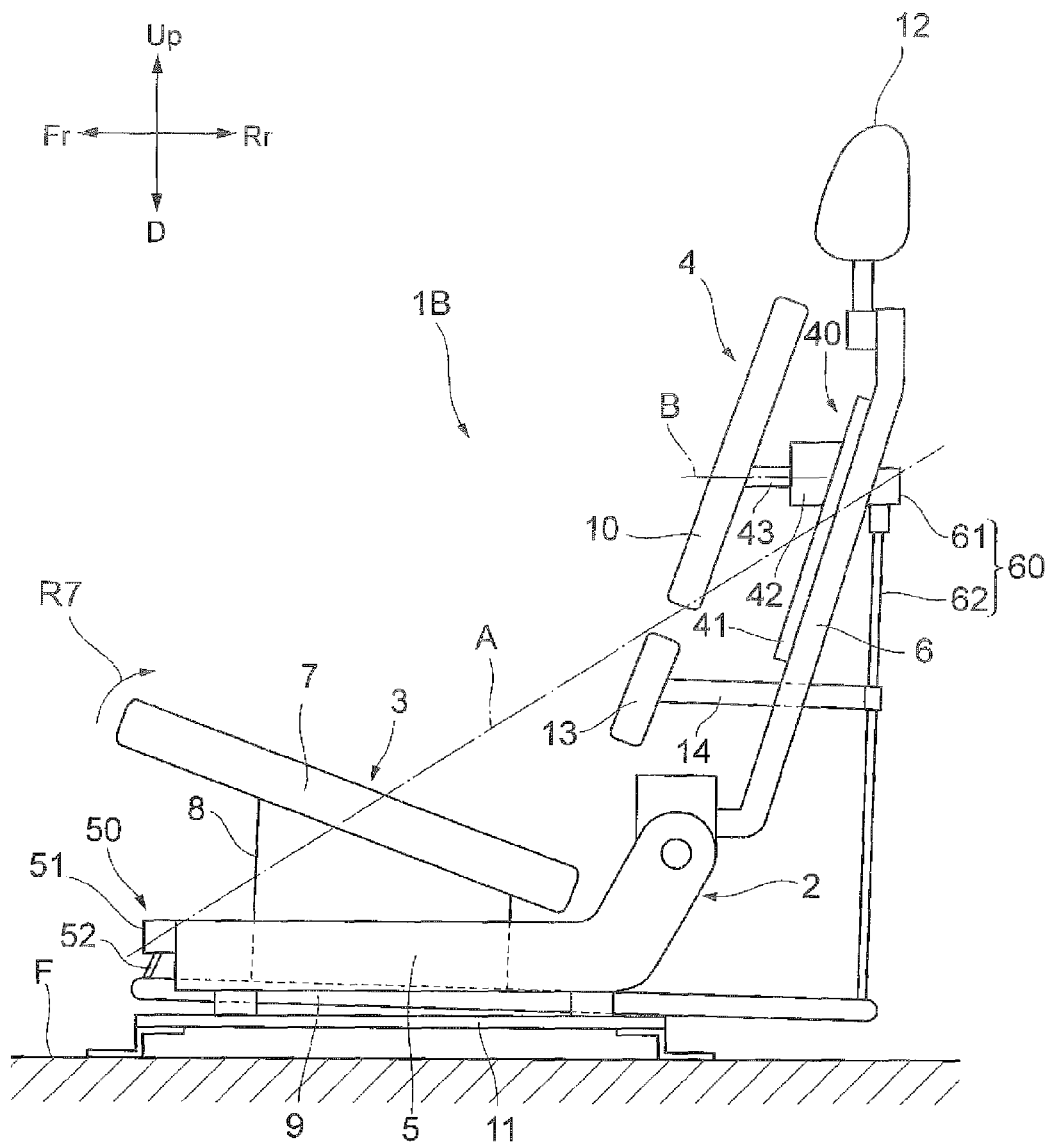
FIG. 16 is a left side view illustrating a movement of a seat in response to a motion of a seated occupant when a vehicle is accelerated.

Hereinafter, referring to FIGS. 16 and 17, movements of the seat 1B according to the second embodiment in response to motions of a seated occupant will be described. FIG. 16 is a left side view illustrating a movement of the seat 1B in response to a motion of the seated occupant when a vehicle is accelerated. FIG. 17 is a left side view illustrating a movement of the seat 1B in response to a motion of the seated occupant when the vehicle is decelerated. The operation of the seat 1B when the vehicle is turned to the right and left is the same as that in a case of the seat 1A according to the first embodiment, and thus description thereof will be omitted.

In the following description, a direction expressed as a clockwise or counterclockwise direction around the rotation axis X1 or the rotation axis X2 is a direction in a side view. Similarly, a direction expressed as a clockwise or counterclockwise direction around the pitch direction is a direction in a side view.

When the vehicle is accelerated, inertia force acting rearward is applied to the occupant, and the shoulder tends to further move rearward than the waist as if the upper body was bent rearward. Therefore, the occupant who tries to accelerate the vehicle uses the trunk muscle to bend the lumbar spine forward and pivotally moves the pelvis counterclockwise in the pitch direction, in order to curb the rearward movement of the shoulder.

At this time, the first suspension portion 52 rotates counterclockwise around the rotation axis X1, and the second suspension portion 62 rotates counterclockwise around the rotation axis X2. Then, as illustrated in FIG. 16, the seating part 3 is pivotally moved counterclockwise (direction of an arrow R7) in the pitch direction. The seating part 3 entirely moves rearward, and is brought into a state where the front side of the seating part 3 moves downward relative to the rear side of the seating part 3. In this manner, the pelvis of the occupant sitting on the seat 1B is pivotally moved in the pitch direction of the vehicle, and is brought into a state where the front side of the pelvis moves downward relative to the rear side of the pelvis.

In addition, in response to the pivot movement of the seating part 3, the waist rest part 13 is pivotally moved in the pitch direction. The waist rest part 13 entirely moves rearward, and is brought into a state where the front side of the waist rest part 13 moves downward relative to the rear side of the waist rest part 13. In this manner, the pelvis of the occupant sitting on the seat 1B moves in a state where the waist periphery is stably supported by the waist rest part 13.

Then, the occupant who tries to accelerate the vehicle uses the trunk muscle so as to bend the lumbar spine forward, and is brought into a state where the pelvis is pivotally moved counterclockwise in the pitch direction. In this manner, since the rearward movement of the shoulder is curbed, the occupant can comfortably maintain a posture during the acceleration.

On the other hand, when the vehicle is decelerated, inertia force acting forward is applied to the occupant, and the shoulder tends to further move forward than the waist as if the upper body was bent forward. Therefore, the occupant who tries to decelerate the vehicle uses the trunk muscle to bend the lumbar spine rearward and pivotally moves the pelvis clockwise in the pitch direction, in order to curb the forward movement of the shoulder.

At this time, as illustrated in FIG. 17, the seating part 3 is pivotally moved clockwise (direction of an arrow R8) in the pitch direction. The seating part 3 entirely moves forward, and is brought into a state where the front side of the seating part 3 moves upward relative to the rear side of the seating part 3. In addition, in response to the pivot movement of the seating part 3, the waist rest part 13 is pivotally moved in the pitch direction. The waist rest part 13 entirely moves forward, and is brought into a state where the front side of the waist rest part 13 moves upward relative to the rear side of the waist rest part 13.

Then, the occupant who tries to decelerate the vehicle uses the trunk muscle so as to bend the lumbar spine rearward, and is brought into a state where the pelvis is pivotally moved clockwise in the pitch direction. In this manner, since the forward movement of the shoulder is curbed, the occupant can comfortably maintain a posture during the deceleration.

According to the seat 1B in the second embodiment, the front side and the rear side of the seating part 3 are suspended and supported. Accordingly, compared to a seat in which a front side of a seating part is supported in a cantilever manner, the seat 1B can ensure bearing capacity for a seating load. The rear side of the seating part 3 is suspended and supported from a side behind the backrest part 4. Accordingly, a support structure around the seating part 3 including the front side of the seating part 3 can be miniaturized.

In addition, a suspension support structure using the compound joints 55 and 65 and the pair of belts 56 and 56, and 66 and 66 is employed, and the seating part 3 is supported so as to be pivotally movable in the pitch direction, the yaw direction, and the rolling direction of the vehicle. This can improve operability when a vehicle is turned and when the vehicle is accelerated and decelerated.

As described above, according to the seats 1A and 1B in the embodiments of the present invention, the front side and the rear side of the seating part 3 are suspended and supported. Accordingly, compared to a seat in which a front side of a seating part is supported in a cantilever manner, the seats 1A and 1B can ensure bearing capacity for a seating load. The rear side of the seating part 3 is suspended and supported from a side behind the backrest part 4. Accordingly, a support structure around the seating part 3 including the front side of the seating part 3 can be miniaturized. In addition, the front side and the rear side of the seating part 3 are suspended and supported, thereby facilitating the pivot movement (or swing) of the seating part 3.

In addition, the seating part 3 is supported such that the right side and the left side of the seating part 3 move relatively in the vertical direction of the seats 1A and 1B by the pivot movement of the seating part 3. Accordingly, the occupant can comfortably perform a steering operation for turning the vehicle. That is, the turning direction side pelvis is moved upward in the vertical direction of the seats 1A and 1B relative to the counter-turning direction side pelvis. This can improve steering operability of the occupant.

In addition, the seating part 3 is supported such that the right side and the left side of the seating part 3 move relatively in the front-to-back direction of the seats 1A and 1B by the pivot movement of the seating part 3. Accordingly, the occupant can comfortably perform a steering operation for turning the vehicle. That is, the turning direction side pelvis is moved forward in the front-to-back direction of the seats 1A and 1B relative to the counter-turning direction side pelvis. This can improve steering operability of the occupant.

In addition, the seating part 3 is supported such that the front side and the rear side of the seating part 7 move relatively in the vertical direction of the seats 1A and 1B by the pivot movement of the seating part 3. Accordingly, the occupant can comfortably maintain a posture for accelerating and decelerating the vehicle. That is, the pelvis is relatively moved in the vertical direction so as to curb a posture change caused by inertial force applied to the occupant during the acceleration and deceleration. In this manner, the maintainability of the posture of the occupant can be improved.

In addition, the virtual axis A connecting the support point of the first supporters 20 and 50 and the support point of the second supporter 30 and 60 to each other is set so as to pass through the waist periphery of the occupant sitting on the seats 1A and 1B. Accordingly, the occupant can easily bend the lumbar spine and can easily twist the lumbar spine. This can further improve steering operability of the occupant.

In addition, the backrest part 4 is supported such that the right side and the left side of the backrest part 4 move relatively in the vertical direction of the seats 1A and 1B by the pivot movement of the backrest part 4. Accordingly, the occupant can comfortably perform a steering operation for turning the vehicle. That is, the turning direction side pelvis is moved downward in the vertical direction of the seats 1A and 1B relative to the counter-turning direction side pelvis. This can improve steering operability of the occupant.

In addition, the waist rest part 13 is supported by the second supporters 30 and 60 so as to be pivotally movable in response to the pivot movement of the seating part 3. Accordingly, even when the seating part 3 and the backrest part 4 are pivotally moved independently from each other, it is easy to ensure stability of the waist periphery of the occupant.

The seat according to the present invention is not limited to those described in the first and second embodiments. The seat according to the present invention may be realized by modifying the seats according to the first and second embodiments within the scope not departing from the gist of the invention described in each claim, or may be applied to other seats.

For example, in the above-described embodiments, a case has been described in which the first and second joint portions 21, 31, 51, and 61 are configured to include the ball joints 25 and 35 or the compound joints 55 and 65. However, at least one of the first and second joint portions 21, 31, 51, and 61 may be configured to include a universal joint or a cross joint.

In the above-described embodiments, a case has been described in which the first and second supporters 20, 30, 50, and 60 support the seat frame 9 among the seating part 3. However, a configuration may be adopted in which the seating surface section 7 is supported instead of the seat frame 9. In this case, the seating surface section 7 is configured to include a seat cover and a cushioning material.

In the above-described embodiments, a case has been described in which the backrest part 4 is supported so as to be pivotally movable in the rolling direction of the vehicle. However, the backrest part 4 may be supported so as to be further pivotally movable in at least any one of the yaw direction and the pitch direction.

In the above-described embodiments, a case has been described which the virtual axis A connects the support point of the first supporters 20 and 50 and the support point of the second supporters 30 and 60 to each other. However, the direction of the virtual axis A is not limited to this direction.

In the above-described second embodiment, a case has been described in which the first and second supporters 50 and 60 are configured to include the pair of joints 51c and 51c, and 61c and 61c, and the pair of belts 56 and 56, and 66 and 66. However, the first and second supporters 50 and 60 may be configured to include a single joint 51c, a single joint 61c, a single belt 56, and a single belt 66. In addition, a corresponding relationship between the joints 51a, 51b, and 51c and the directions of the rotation axes X1, Z1, and Y1, or a corresponding relationship between the joints 61a, 61b, and 61c and the directions of the rotation axes X2, Z2', and Y2' may be appropriately changed.

REFERENCE SIGNS LIST 1A, 1B SEAT
2 FRAME
3 SEATING PART
4 BACKREST PART
5 LOWER FRAME
6 REAR FRAME
7 SEATING SURFACE SECTION
8 BASE SECTION
9 SEAT FRAME
13 WAIST REST PART
20, 50 FIRST SUPPORTER
21, 51 FIRST JOINT PORTION
22, 52 FIRST SUSPENSION PORTION
30, 60 SECOND SUPPORTER
31, 61 SECOND JOINT PORTION
32, 62 SECOND SUSPENSION PORTION
40 THIRD SUPPORTER
41 SLIDING PLATE
42 BEARING
43 SUPPORT MEMBER

The invention claimed is:

1. A seat comprising:
a pivotally movable seating part;
a pivotally movable backrest part provided separate from the seating part and pivotally movable independent of the seating part;
a first supporter suspending and supporting a front side of the seating part; and
a second supporter suspending a rear side of the seating part from a side behind the backrest part and supporting the seating part to be pivotally movable together with the first supporter,
wherein the first supporter comprises a first ball joint and first coupling member which couples the first ball joint and the seating part;
wherein the second supporter comprises a second ball joint and a second coupling member which couples the second ball joint and the seating part.

2. The seat according to claim 1,
wherein the first and second supporters support the seating part such that a right side and a left side of the seating part move relatively in a vertical direction of the seat by a pivot movement of the seating part.

3. The seat according to claim 1,
wherein the first and second supporters support the seating part such that a right side and a left side of the seating part move relatively in a front-to-back direction of the seat by a pivot movement of the seating part.

4. The seat according to claim 1,
wherein the first and second supporters support the seating part such that a front side and a rear side of the seating part move relatively in a vertical direction of the seat by a pivot movement of the seating part.

5. The seat according to claim 1,
wherein a virtual axis connecting a support point of the first supporter and a support point of the second supporter is set so as to pass a waist periphery of an occupant sitting on the seat.

6. The seat according to claim 1, further comprising:
a lower frame extending in a front-to-back direction of the seat; and
a rear frame erected from the lower frame,
wherein the first supporter is attached to the lower frame, and the second supporter is attached to the rear frame.

7. The seat according to claim 6,
wherein the second supporter has a coupling member extending from a side of the rear frame in a downward direction of the seat and connected to the seating part.

8. The seat according to claim 6,
wherein the second supporter has a pair of belts extending from a side of the rear frame in a downward direction of the seat and connected to the seating part.

9. The seat according to claim 8,
wherein the second supporter has a bending member including a tilting section that tilts and extends rearward and downward and a bent section that is bent and extends forward and downward from a lower part of the tilting section, and a lower end of the bending member is connected to an upper end of the belts.

10. The seat according to claim 1, further comprising:
a third supporter supporting a rear side of the backrest part,
wherein the third supporter supports the backrest part such that a right side and a left side of the backrest part move relatively in a vertical direction of the seat by a pivot movement of the backrest part.

11. A seat comprising:
a pivotally movable seating part;
a pivotally movable backrest part provided separate from the seating part and pivotally movable independent of the seating part;
a waist rest part separate from the seating part and the backrest part;
a first supporter suspending and supporting a front side of the seating part; and
a second supporter suspending a rear side of the seating part from a side behind the backrest part and supporting the seating part to be pivotally movable together with the first supporter,
wherein the waist rest part is supported by the second supporter to pivotally movable with the pivot movement of the seating part.

* * * * *